(12) United States Patent
Esteban et al.

(10) Patent No.: US 9,734,551 B1
(45) Date of Patent: Aug. 15, 2017

(54) PROVIDING DEPTH-OF-FIELD RENDERINGS

(71) Applicant: Google Inc., Mountain View, CA (US)

(72) Inventors: Carlos Hernandez Esteban, Kirkland, WA (US); Li Zhang, Seattle, WA (US)

(73) Assignee: Google Inc., Mountain View, CA (US)

( * ) Notice: Subject to any disclaimer, the term of this patent is extended or adjusted under 35 U.S.C. 154(b) by 141 days.

(21) Appl. No.: 14/093,500

(22) Filed: Dec. 1, 2013

(51) Int. Cl.
  *H04N 1/387* (2006.01)
  *G06T 5/00* (2006.01)
  *G06T 3/00* (2006.01)

(52) U.S. Cl.
  CPC .............. *G06T 3/0093* (2013.01); *G06T 5/00* (2013.01); *H04N 1/387* (2013.01)

(58) Field of Classification Search
  CPC ....... G06T 7/0081; G06T 5/001; G06T 19/00; G06T 11/001; G06T 5/004; G09G 5/00; G09G 5/393; H04N 5/23238; H04N 5/23212; H04N 1/3872; G06F 3/0484
  USPC ....... 345/419, 632, 634, 626, 422, 619, 629, 345/647; 348/218.1, 346; 382/180, 255, 382/199, 254, 282, 283
  See application file for complete search history.

(56) References Cited

U.S. PATENT DOCUMENTS

| | | | |
|---|---|---|---|
| 6,956,576 B1* | 10/2005 | Deering | G06T 15/00 345/619 |
| 8,035,641 B1* | 10/2011 | O'Donnell | 345/634 |
| 2002/0109701 A1* | 8/2002 | Deering | 345/581 |
| 2012/0249836 A1 | 10/2012 | Ali et al. | |
| 2013/0071028 A1* | 3/2013 | Schiller et al. | 382/180 |
| 2013/0202220 A1* | 8/2013 | Takeshita | H04N 13/026 382/264 |
| 2013/0230259 A1 | 9/2013 | Intwala et al. | |
| 2014/0184586 A1* | 7/2014 | Kelley | H04N 5/23212 345/419 |
| 2014/0232820 A1* | 8/2014 | Ha | H04N 13/026 348/43 |
| 2014/0267243 A1* | 9/2014 | Venkataraman et al. | 345/419 |
| 2014/0341442 A1* | 11/2014 | Lewis | G06K 9/00248 382/118 |
| 2014/0354843 A1* | 12/2014 | Venkataraman et al. | 348/218.1 |
| 2015/0002545 A1* | 1/2015 | Webster et al. | 345/634 |
| 2015/0002724 A1* | 1/2015 | Chuang et al. | 348/346 |
| 2015/0116353 A1* | 4/2015 | Miura et al. | 345/632 |

* cited by examiner

*Primary Examiner* — Chante Harrison
(74) *Attorney, Agent, or Firm* — IP Spring

(57) ABSTRACT

Implementations generally relate to providing depth-of-field renderings. In some implementations, a method includes linearizing an image. The method further includes partitioning a depth map of the image into a plurality of depth intervals. The method further includes blurring pixels associated with each depth interval, where the pixels of each depth interval are blurred separately from the pixels of the other depth intervals. The method further includes applying at least one camera response function to the image after the pixels of the plurality of depth intervals are blurred.

20 Claims, 30 Drawing Sheets

300

300

710

720

740

750

800

840

850

900

PROVIDING DEPTH-OF-FIELD RENDERINGS

BACKGROUND

Depth-of-field rendering algorithms are used to simulate the blur created by a single-lens reflex (SLR) lens. The typical input to a depth-of-field rendering algorithm is an all-in-focus image and a depth map. Given new lens settings (e.g., focal depth and aperture), a depth-of-field rendering algorithm blurs the input image, where the amount of blur is guided by the depth values. Depth-of-field renderings are used in many graphics applications such as video games or image editing applications in order to add realistic blur to an original all-in-focus image, thus creating a more pleasing image. Such algorithms are very expensive to run, as they involve variable-size convolutions.

SUMMARY

Implementations generally relate to providing depth-of-field renderings. In some implementations, a method includes linearizing an image. The method further includes partitioning a depth map of the image into a plurality of depth intervals. The method further includes blurring pixels associated with each depth interval, where the pixels of each depth interval are blurred separately from the pixels of the other depth intervals. The method further includes applying at least one camera response function to the image after the pixels of the plurality of depth intervals are blurred.

With further regard to the method, in some implementations, the linearizing of the image includes removing at least one camera response function that has been already applied to the image. In some implementations, each depth interval corresponds to a predetermined power-of-N blur radius. In some implementations, the depth intervals are disjointed. In some implementations, the blurring is a disk blur. In some implementations, the method further includes masking pixels of each depth interval that are not being blurred while pixels of a current depth interval are being blurred. In some implementations, the method further includes: masking pixels of each depth interval that are not being blurred while pixels of a current depth interval are being blurred; and in-painting masked pixels. In some implementations, the method further includes blending blurred pixels of at least one depth interval with previously blurred pixels of at least one other depth interval. In some implementations, the at least one camera response function is a gamma correction.

In some implementations, a method includes linearizing an image, where the linearizing includes removing at least one camera response function that has been already applied to the image. The method further includes partitioning a depth map of the image into a plurality of depth intervals. The method further includes blurring pixels associated with each depth interval, where the pixels of each depth interval are blurred separately from the pixels of the other depth intervals. The method further includes blending blurred pixels of at least one depth interval with previously blurred pixels of at least one other depth interval. The method further includes applying at least one camera response function to the image after the pixels of the plurality of depth intervals are blurred.

With further regard to the method, in some implementations, the at least one camera response function is a gamma correction. In some implementations, each depth interval corresponds to a predetermined power-of-N blur radius. In some implementations, the method further includes masking pixels of each depth interval that are not being blurred while pixels of a current depth interval are being blurred. In some implementations, the blurring is applied to each depth interval using a disk kernel, and wherein a blur radius changes per pixel.

In some implementations, a system includes one or more processors, and logic encoded in one or more tangible media for execution by the one or more processors. When executed, the logic is operable to perform operations including: linearizing an image; partitioning a depth map of the image into a plurality of depth intervals; blurring pixels associated with each depth interval, where the pixels of each depth interval are blurred separately from the pixels of the other depth intervals; and applying at least one camera response function to the image after the pixels of the plurality of depth intervals are blurred.

With further regard to the system, in some implementations, to linearize the image, the logic when executed is further operable to perform operations including removing at least one camera response function that has been already applied to the image. In some implementations, each depth interval corresponds to a predetermined power-of-N blur radius. In some implementations, the depth intervals are disjointed. In some implementations, the blurring is a disk blur. In some implementations, the logic when executed is further operable to perform operations including masking pixels of each depth interval that are not being blurred while pixels of a current depth interval are being blurred. In some implementations, the logic when executed is further operable to perform operations including: masking pixels of each depth interval that are not being blurred while pixels of a current depth interval are being blurred; and in-painting masked pixels.

DETAILED DESCRIPTION

Implementations provide depth-of-field renderings using a layer-based approach that significantly reduces rendering time. Using layers reduces computation time and improves quality by using the layers to deal with depth boundaries. In various implementations, a system linearizes an image by removing at least one camera response function such as gamma correction that has been already applied to the image. As described in more detail below, in various implementations, the camera response function is removed once, before any other processing. The system then partitions a depth map of the image into separate depth intervals. In some implementations, each depth interval corresponds to a predetermined power-of-N blur radius.

The system then blurs pixels associated with each depth interval, where the pixels of each depth interval are blurred separately from the pixels of the other depth intervals. In some implementations, the system masks pixels of each depth interval that are not being blurred while pixels of a current depth interval are being blurred, and where the masking prevents pixels from being blurred. In some implementations, the system blends blurred pixels of a depth interval with previously blurred pixels of at least one other depth interval. The system then applies at least one camera response function such as a gamma correction to the image after the pixels of the depth intervals are blurred. As described in more detail below, the camera response function is re-applied once, after all of the layers have been merged together.

As a result, portions of the image that are in the focal plane are clear, and portions of the image that are out of the focal plane are blurred by different amounts according to the depth of the pixels and the focal plane. Implementations render an initially all-in-focus image such that it appears to have been captured with a single-lens reflex (SLR) camera.

Figure 1:
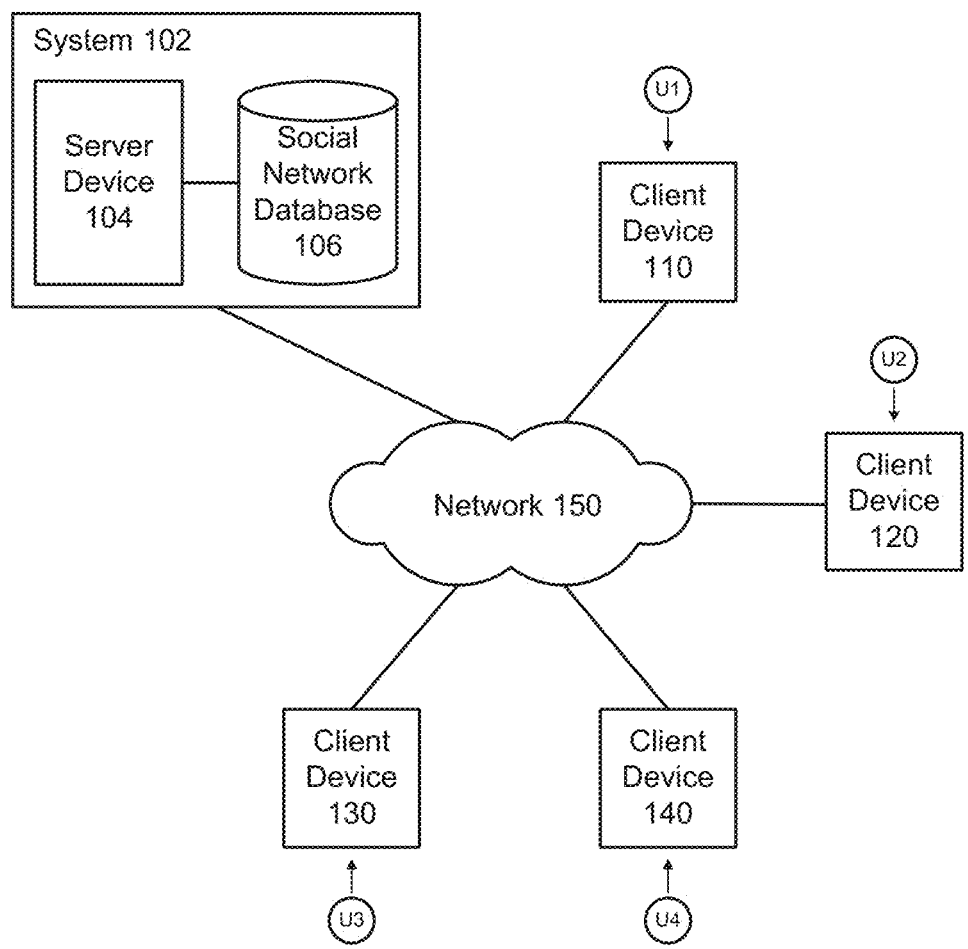
FIG. 1 illustrates a block diagram of an example network environment, which may be used to implement the implementations described herein.

FIG. 1 illustrates a block diagram of an example network environment 100, which may be used to implement the implementations described herein. In some implementations, network environment 100 includes a system 102, which includes a server device 104 and a social network database 106. In various implementations, the term system 102 and phrase "social network system" may be used interchangeably. Network environment 100 also includes client devices 110, 120, 130, and 140, which may communicate with each other via system 102. Network environment 100 also includes a network 150.

For ease of illustration, FIG. 1 shows one block for each of system 102, server device 104, and social network database 106, and shows four blocks for client devices 110, 120, 130, and 140. Blocks 102, 104, and 106 may represent multiple systems, server devices, and social network databases. Also, there may be any number of client devices. In other implementations, network environment 100 may not have all of the components shown and/or may have other elements including other types of elements instead of, or in addition to, those shown herein.

In various implementations, users U1, U2, U3, and U4 may communicate with each other using respective client devices 110, 120, 130, and 140. Users U1, U2, U3, and U4 may also interact with system 102 to provide images for depth-of-field renderings.

In the various implementations described herein, processor of system 102 causes the elements described herein (e.g., original all-in-focus images, depth-of-field renderings, etc.) to be displayed in a user interface on one or more display screens.

While some implementations are described herein in the context of a social network system, these implementations may apply in contexts other than a social network. For example, implementations may apply locally for an individual user. For example, system 102 may perform the implementations described herein on a stand-alone computer, tablet computer, smartphone, etc.

Figure 2:
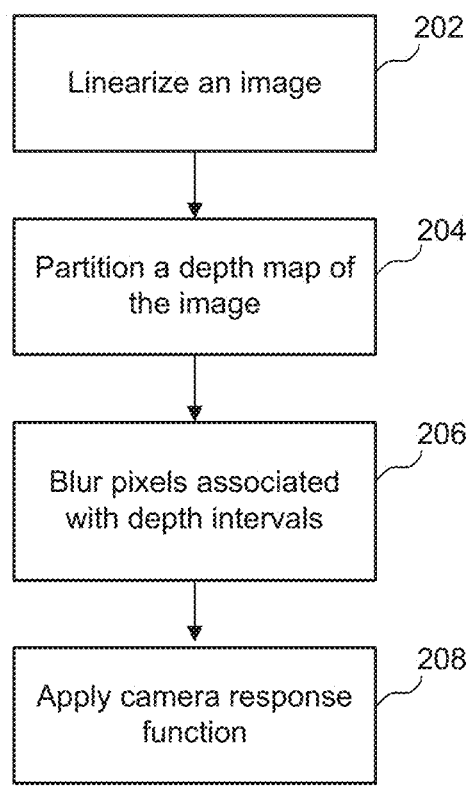
FIG. 2 illustrates an example simplified flow diagram for providing depth-of-field renderings, according to some implementations.

FIG. 2 illustrates an example simplified flow diagram for providing depth-of-field renderings, according to some implementations. Referring to both FIGS. 1 and 2, a method is initiated in block 202, where system 102 linearizes an image. In various implementations, system 102 obtains the image, where the entire image is in focus.

In some implementations, to linearize the image, system 102 removes at least one camera response function that has been already applied to the image. In some implementations, to linearize the image, system 102 removes at least one camera response function that has been already applied to the image, where the camera response function is a gamma correction that has been already applied to the image.

Figure 3:
FIG. 3 illustrates an example image that has not been linearized, according to some implementations.

FIG. 3 illustrates an example image 300 that has not been linearized, according to some implementations. As shown, the entire image 300 is in focus. Also, a camera response function has been applied to image 300. More specifically, in this example implementation, a gamma correction has been applied to image 300.

Figure 4:
FIG. 4 illustrates example image after being linearized, according to some implementations.

FIG. 4 illustrates example image 300 after being linearized, according to some implementations. As shown, the camera response function has been removed from image 300. More specifically, in this example implementation, system 102 has removed the gamma correction from image 300.

In various implementations, system 102 also obtains a depth map of the image, where the depth map provides depth-of-field values for the pixels in the image.

In block 204, system 102 partitions a depth map of the image into multiple depth intervals. The number depth intervals is a predetermined number, which will depend on the particular implementation. In various implementations, system 102 partitions the depth map of the image into disjointed depth intervals. Each pixel of the image is associated with one of the layers of the depth map. Accordingly, the image is partitioned into different layers or depth intervals such that each pixel of the image is associated with one of the layers/intervals.

In some implementations, each depth interval corresponds to a predetermined power-of-N blur radius. The actual value of N may vary and will depend on the particular implementation. For example, each interval may substantially correspond to a power-of-2 blur radius.

In block 206, system 102 blurs pixels associated with each depth interval, where the pixels of each depth interval are blurred separately from the pixels of the other depth intervals. In various implementations, system 102 processes each depth interval (or depth layer) separately. For example, system 102 may starting from the back interval and work toward the front interval. In various implementations, the pixels of the image are grouped by degrees of blur. Blurring groups of pixels by interval is computationally much faster than blurring pixels individually.

In some implementations, system 102 computes a blur mask to select which pixels in the current layer need to be blurred. As indicated above, system 102 may select each interval one at a time, from back to front.

FIGS. 5A-5F illustrate a series of example masks for image 300, from back to front of the image. FIGS. 5A-5F show 6 masks corresponding to 6 depth layers or depth intervals. In various implementations described herein, the terms depth layers, layers, depth intervals, and intervals are used interchangeably. The number of masks and corresponding intervals may vary depending on the particular implementation.

Figure 5A:
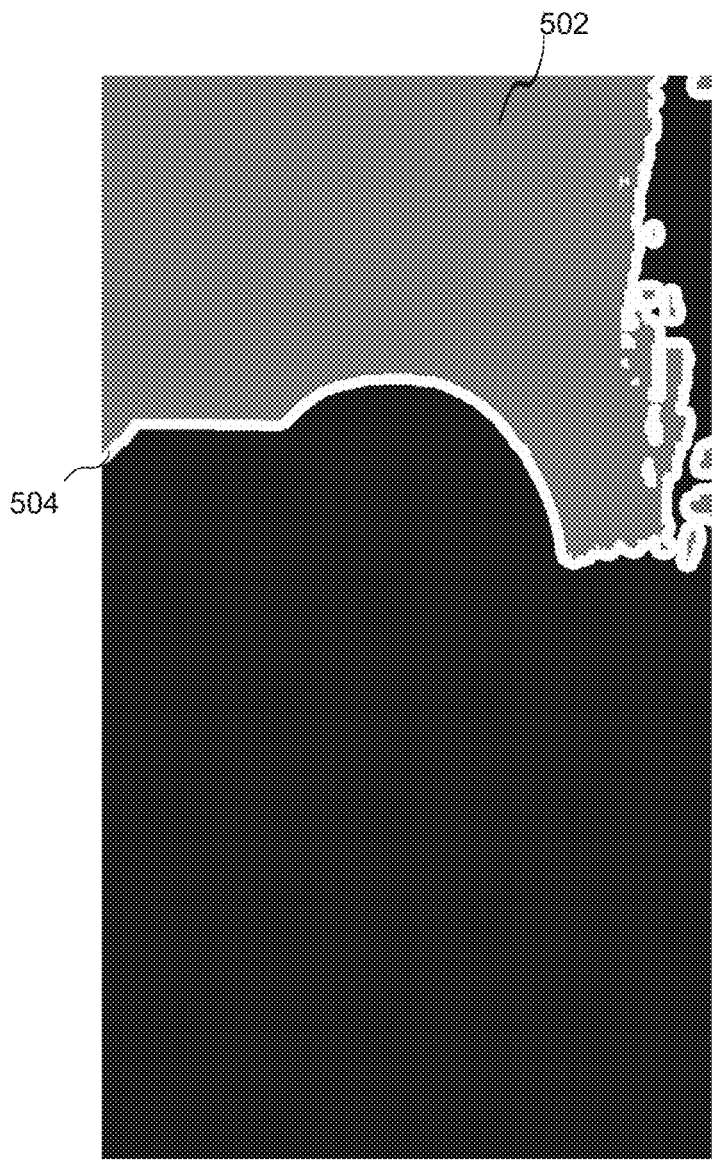
FIG. 5A illustrates an example mask corresponding to the backmost interval, according to some implementations.

FIG. 5A illustrates an example mask 502 corresponding to the backmost layer or interval, according to some implementations. As shown, mask 502 is indicated with gray. In some implementations, mask 502 includes a mask border 504, which is indicated with white. A function of mask border 504 is described in more detail below. Referring to both FIGS. 4 and 5A, mask 502 masks the backmost interval (e.g., backmost portion or most distant background) of FIG. 4.

Figure 5B:
FIG. 5B illustrates an example mask corresponding to an intermediary interval, according to some implementations.

FIG. 5B illustrates an example mask 512 corresponding to an intermediary interval immediately in front of the interval corresponding to mask 502 of FIG. 5A, according to some implementations. FIG. 5B shows mask 512 and a border 514. Referring to both FIGS. 4 and 5B, mask 512 masks the interval immediately in front of the backmost interval of FIG. 4.

Figure 5C:
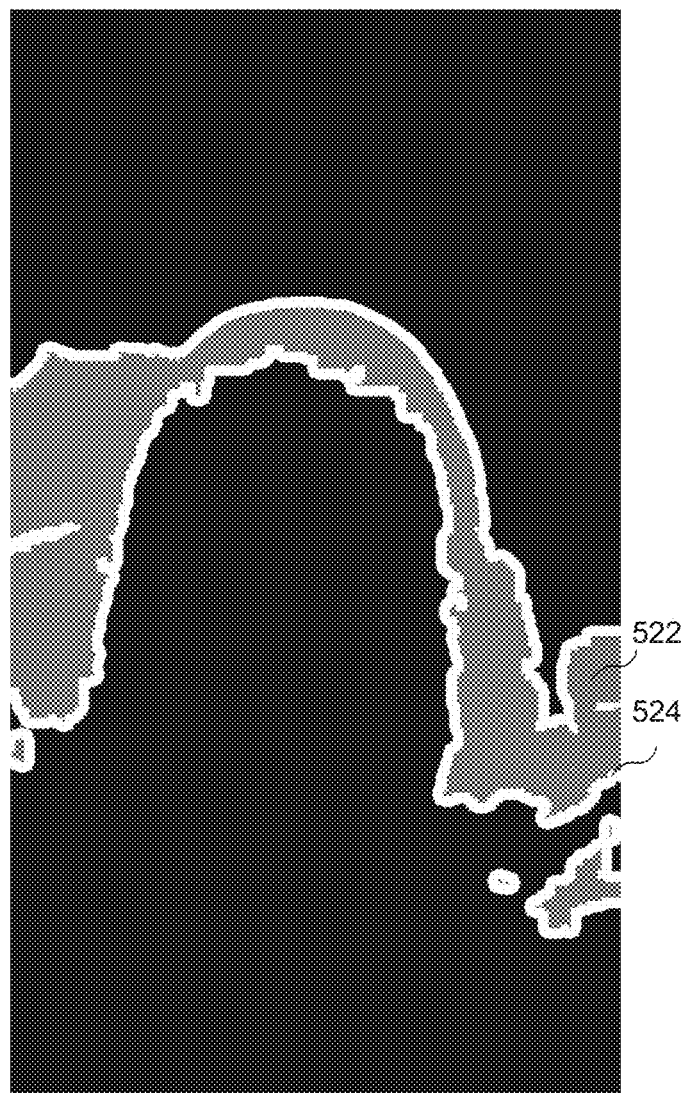
FIG. 5C illustrates an example mask corresponding to an intermediary interval, according to some implementations.

FIG. 5C illustrates an example mask 522 corresponding to an intermediary interval immediately in front of the interval corresponding to mask 512 of FIG. 5B, according to some implementations. FIG. 5C shows mask 522 and a border 524.

Figure 5D:
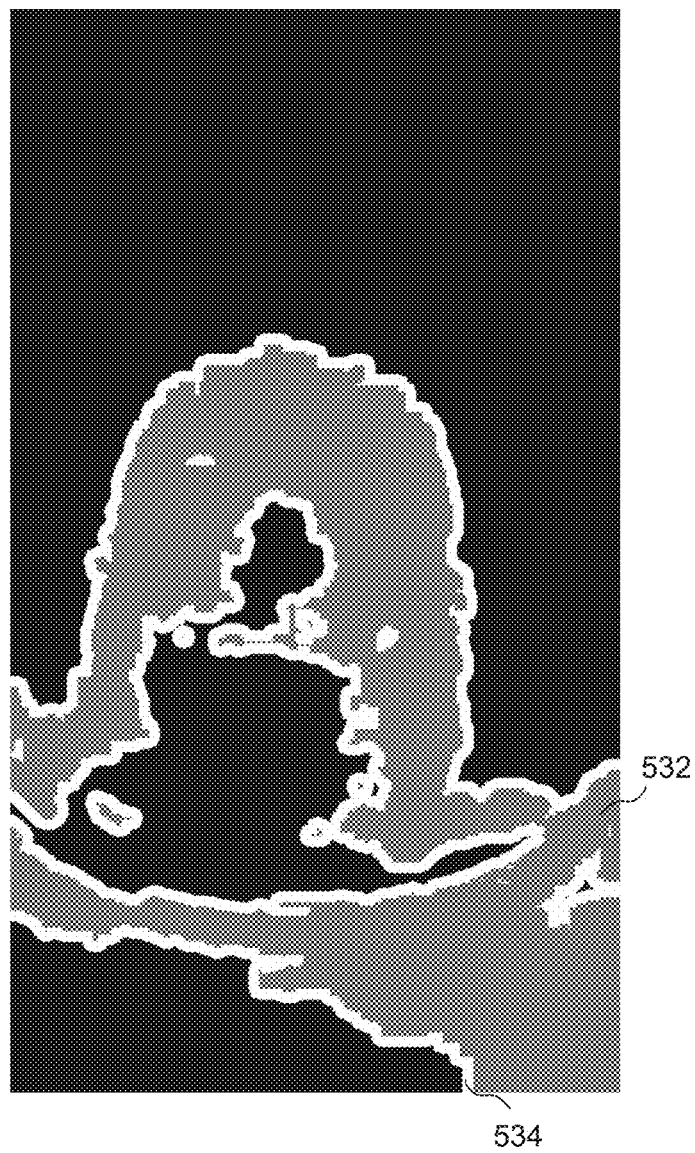
FIG. 5D illustrates an example mask corresponding to an intermediary interval, according to some implementations.

FIG. 5D illustrates an example mask 532 corresponding to an intermediary interval immediately in front of the interval corresponding to mask 522 of FIG. 5C, according to some implementations. FIG. 5D shows mask 532 and a border 534.

Figure 5E:
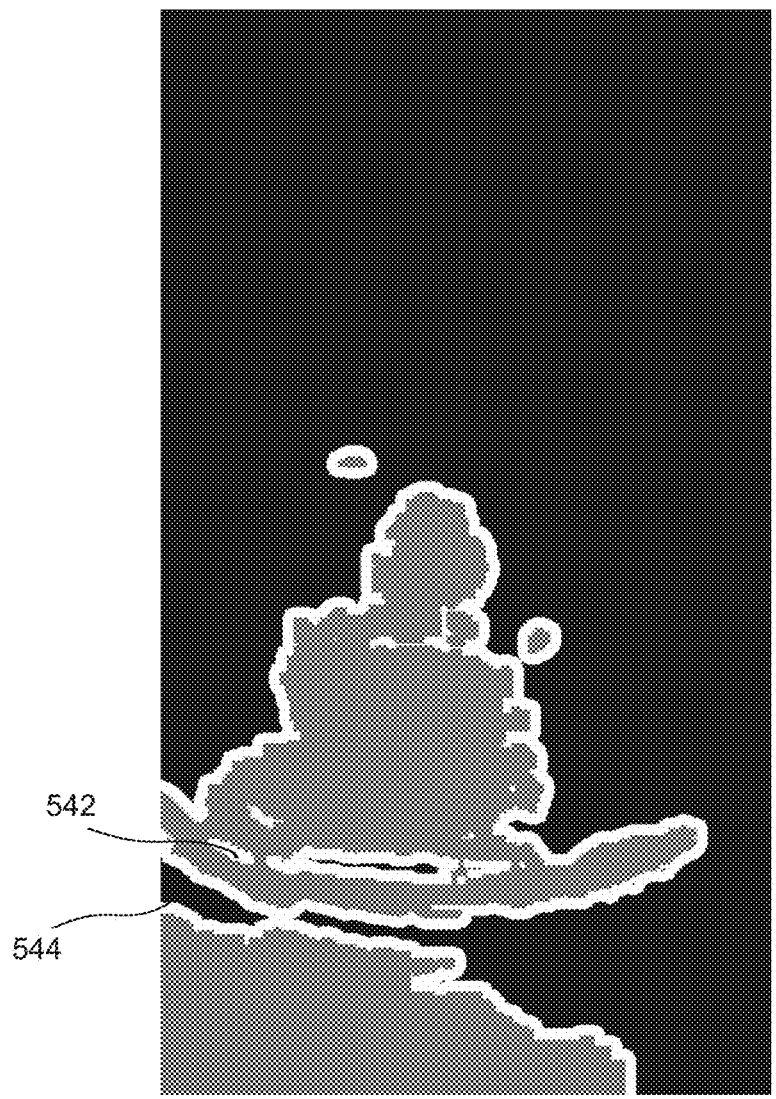
FIG. 5E illustrates an example mask corresponding to an intermediary interval, according to some implementations.

FIG. 5E illustrates an example mask 542 corresponding to an intermediary interval immediately in front of the interval corresponding to mask 532 of FIG. 5D, according to some implementations. FIG. 5E shows mask 542 and a border 544.

Figure 5F:
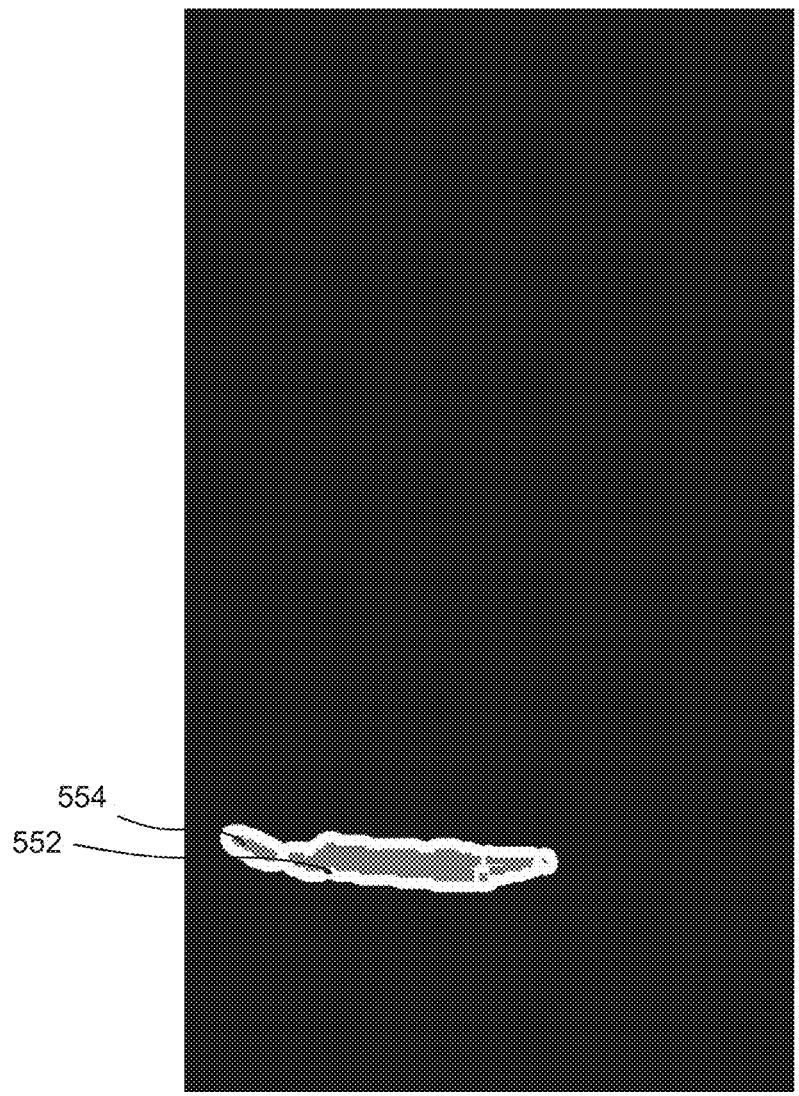
FIG. 5F illustrates an example mask corresponding to an intermediary interval, according to some implementations.

FIG. 5F illustrates an example mask 552 corresponding to an intermediary interval immediately in front of the interval corresponding to mask 542 of FIG. 5E, according to some implementations. FIG. 5F shows mask 552 and a border 554. Referring to both FIGS. 4 and 5F, mask 552 masks the frontmost interval of FIG. 4.

Referring to FIGS. 5A-5F, the gray portions of masks 502, 512, 522, 532, 542, and 552 do not overlap. In some implementations, portions of border 514 overlap with the gray portion of mask 502, portions of border 524 overlap with the gray portion of mask 512, portions of border 534 overlap with the gray portion of mask 522, portions of border 544 overlap with the gray portion of mask 532, and portions of border 554 overlap with the gray portion of mask 542.

FIGS. 6A-6F illustrate a series of example results from a culling process, where intervals for an image in front of a given masked interval are culled or removed from the image.

Figure 6A:
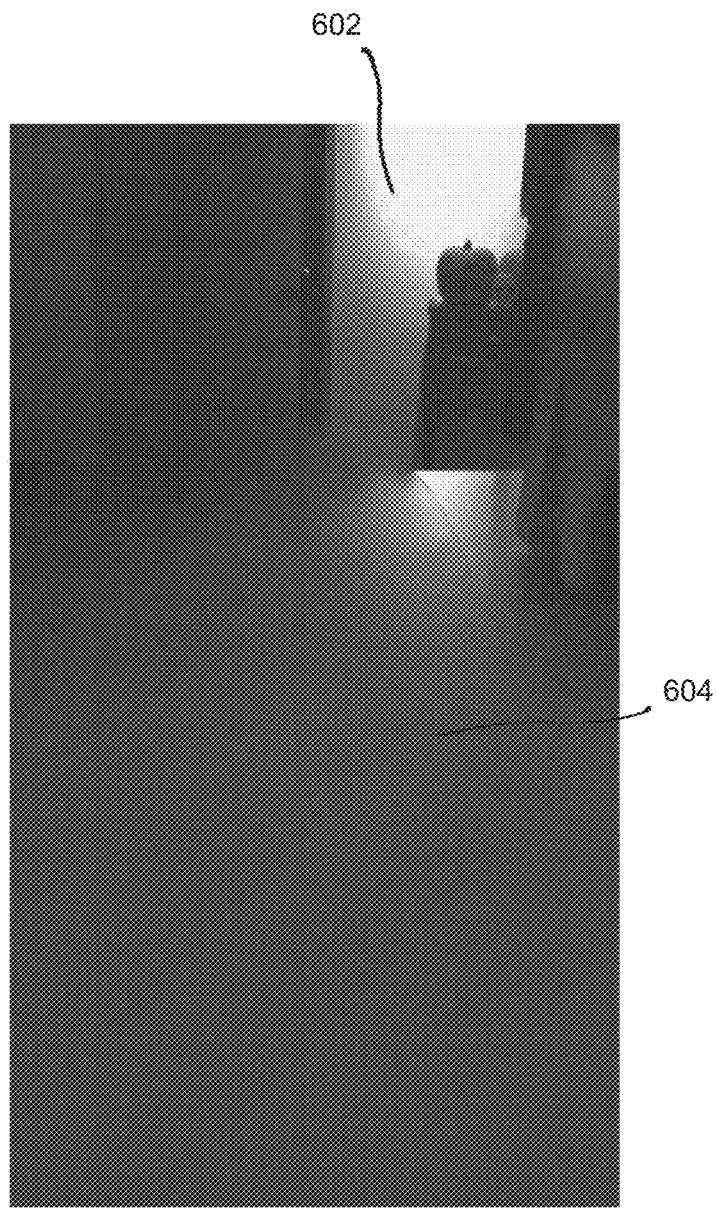
FIG. 6A illustrates an example culled image, according to some implementations.

FIG. 6A illustrates an example culled image 600, where the backmost interval 602 had been masked (by mask 502 of FIG. 5A) and the group of intervals 604 in front of interval 602 have been removed, according to some implementations.

In some implementations, system 102 masks the red-green-blue (RGB) color of the input image in order to remove all the pixels in front of the current layer (e.g., current interval 602). As shown, mask 502 has been removed after the culling step.

In some implementations, when system 102 processes intervals in front of the focal plane, system 102 does not mask the RGB color of the input image. This prevents color bleeding. Also, in some implementations, when system 102 processes intervals behind or in back of the focal plane, system 102 does mask the RGB color of the input image. This removes artifacts.

In some implementations, system 102 may in-paint the removed pixels in front of the current interval (e.g., interval 602). In various implementations, system 102 in-paints both the color image and the depth map (e.g., both masked pixels and masked depth values). As shown, in the example implementation, the pixels of the group of intervals 604 are in-painted. In some implementations, to in-paint the layers, system 102 in-paints masked pixels in front of the current layer, but not the ones behind the current layer, which remain black. Also, in some implementations, system 102 dilates the masks so that there is an overlap of size (e.g., max_blur) so that the blend between layers is seamless. In some implementations, system 102 does not in-paint the removed pixels. This is because, in some implementations, the removed pixels are later occluded by overlaid intervals.

Figure 6B:
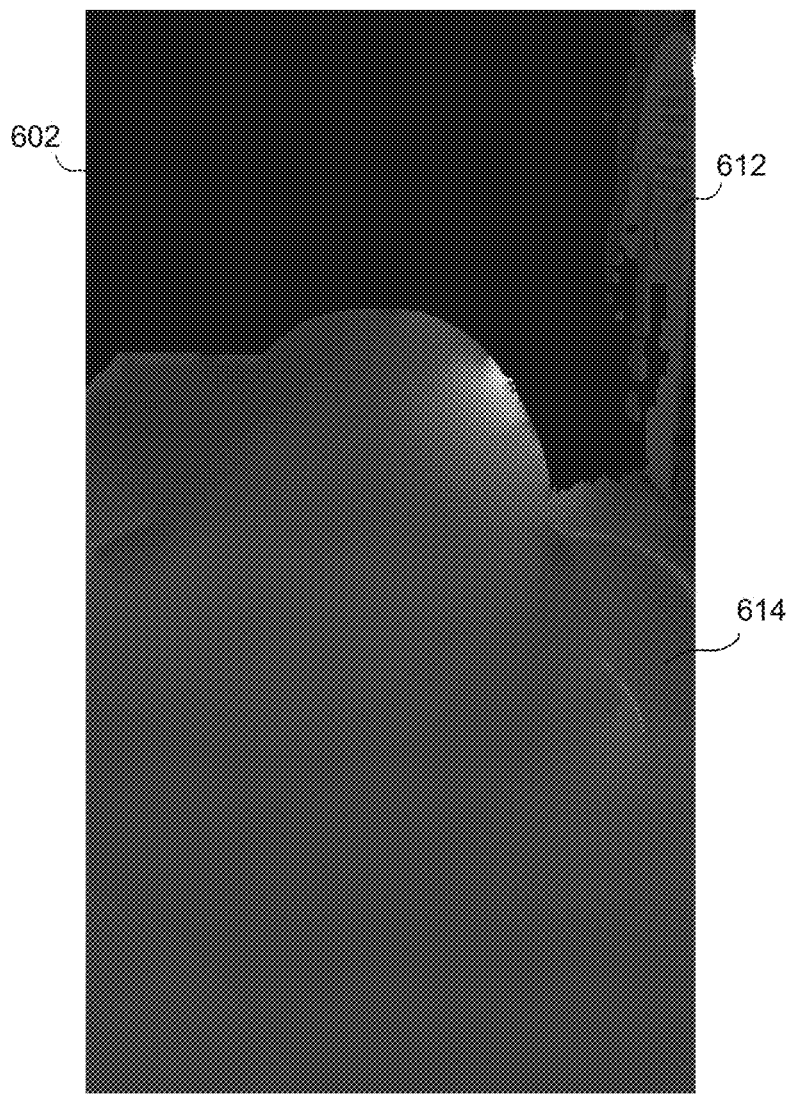
FIG. 6B illustrates an example culled image, according to some implementations.

FIG. 6B illustrates an example culled image 610, where the interval 612 immediately in front of backmost interval 602 (blacked out) had been masked (by mask 512 of FIG. 5B), and the group of intervals 614 in front of interval 612 have been removed, according to some implementations.

Also, as shown, in some implementations, system 102 may mask the color image to set the color pixels behind the current layer (e.g., interval 612 or any intervals behind the current layer) to 0. As a result, the pixels of interval 602 are black. This is one way to enable system 102 to process each interval one at a time. As shown, mask 512 has been removed after the culling step. In some implementations, system 102 does not mask the color image to set the color pixels behind the current layer (e.g., interval 612) to 0. System 102 may still process each interval one at a time.

In some implementations, system 102 may mask the original depth map to remove the pixels in front and behind the current layer. As shown, in some implementations, system 102 may in-paint the removed depth map pixels in front of the current layer (e.g., interval 612). In various implementations, system 102 in-paints both the color image and the depth map (e.g., both masked pixels and masked depth values). In some implementations, system 102 does not mask the original depth map to remove the pixels in the front and behind the current layer. In some implementations, system 102 does not in-paint the removed depth map pixels in front of the current layer. In various implementations, omitting some steps increases computation speed.

Figure 6C:
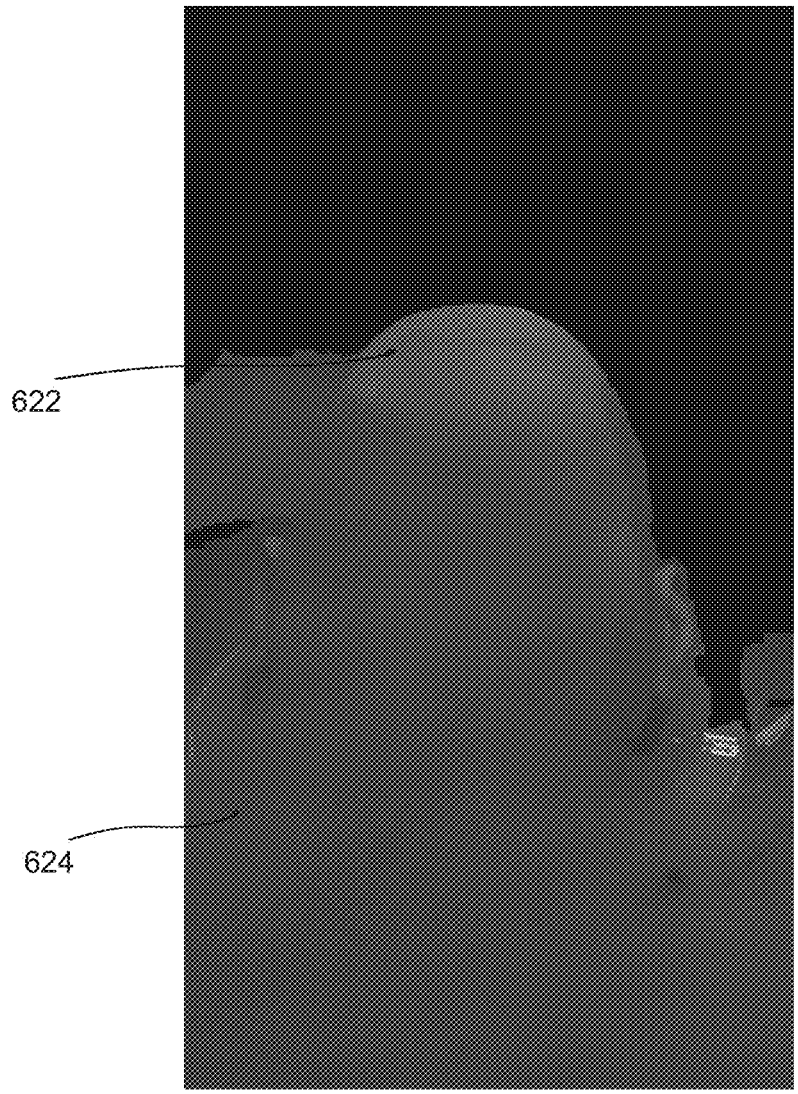
FIG. 6C illustrates an example culled image, according to some implementations.

FIG. 6C illustrates an example culled image 620, where the interval 622 immediately in front of interval 612 (not shown/blacked out) had been masked (by mask 522 of FIG. 5C) and the group of intervals 624 in front of interval 622 have been removed, according to some implementations. As shown, in some implementations, system 102 may in-paint the removed depth map pixels in front of the current layer (e.g., interval 622).

Figure 6D:
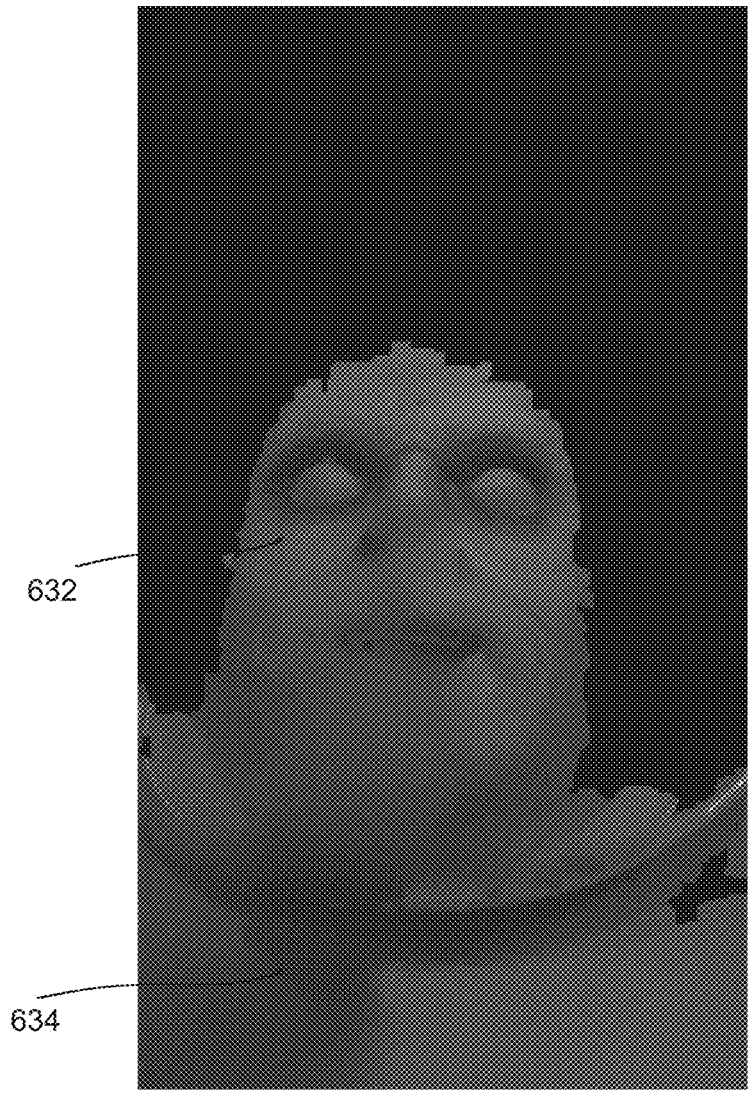
FIG. 6D illustrates an example culled image, according to some implementations.

FIG. 6D illustrates an example culled image 630, where the interval 632 immediately in front of interval 622 had been masked (by mask 532 of FIG. 5D) and the group of intervals 634 in front of interval 622 (blacked out) have been removed, according to some implementations. As shown, in some implementations, system 102 may in-paint the removed depth map pixels in front of the current layer (e.g., interval 632).

Figure 6E:
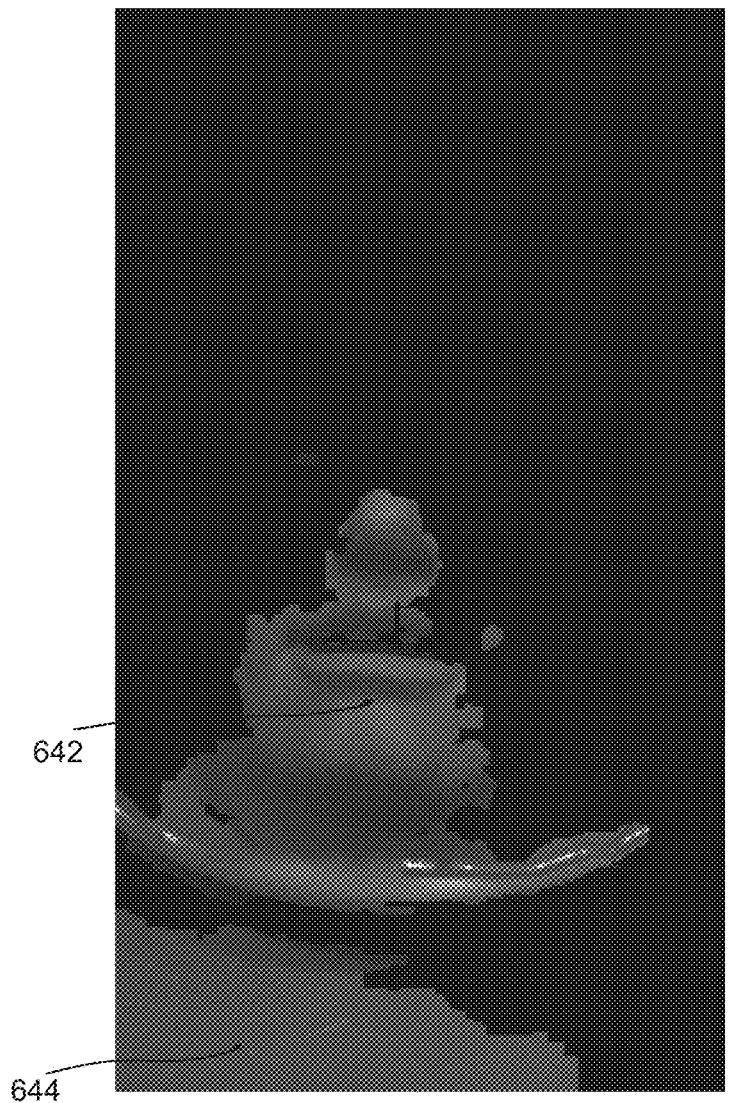
FIG. 6E illustrates an example culled image, according to some implementations.

FIG. 6E illustrates an example culled image 640, where the interval 642 immediately in front of interval 632 (not shown/blacked out) had been masked (by mask 542 of FIG. 5E) and the group of intervals 644 in front of interval 632 have been removed, according to some implementations.

Figure 6F:
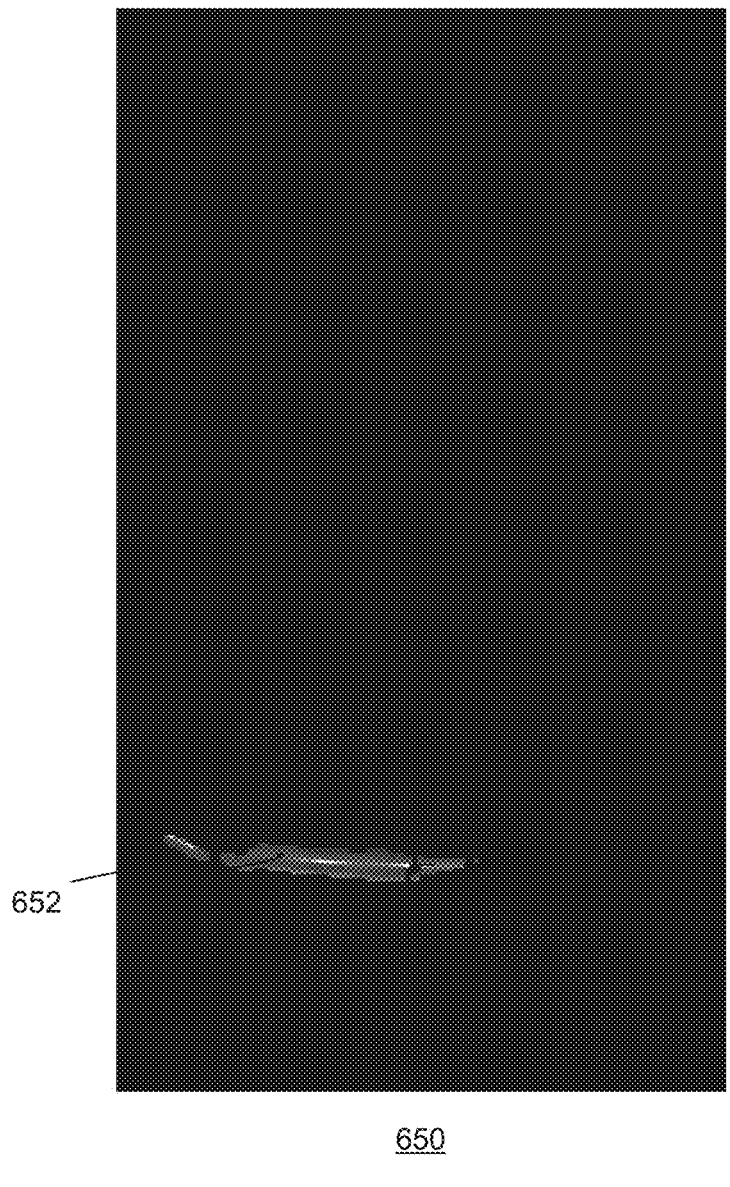
FIG. 6F illustrates an example culled image, according to some implementations.

FIG. 6F illustrates an example culled image 650, where the interval 652 immediately in front of interval 642 (not shown/blacked out) had been masked (by mask 552 of FIG. 5F) and the group of intervals in front of interval 642 have been removed, according to some implementations.

FIGS. 7A-7F illustrate a series of example results from the blurring process, where intervals are individually blurred. In various implementations, system 102 masks pixels of each depth interval that are not being blurred while pixels of a current depth interval are being blurred.

In some implementations, the blurring is a disk blur, which provides renderings with bokeh effects. More specifically, in some implementations, system 102 applies the blur to each depth interval/layer using a disk kernel, instead of a gaussian kernel. In various implementations, system 102 changes the blur radius per pixel, so that two neighboring pixels with similar depth and that belong to different layers have comparable blur radii, thus avoiding quantization errors.

In some implementations, system 102 may apply the following equation to convert from depth to blur radius. Given the focal plane d_f in depth units, and the blur at infinity in pixels b_inf (related to the aperture), the blur of a pixel with depth d is:

$$b = b\_inf * abs(d - d\_f) / d.$$

Such disk blurring is advantageous over Gaussian blurring, because Gaussian blurring cannot produce bokeh effects.

Figure 7A:
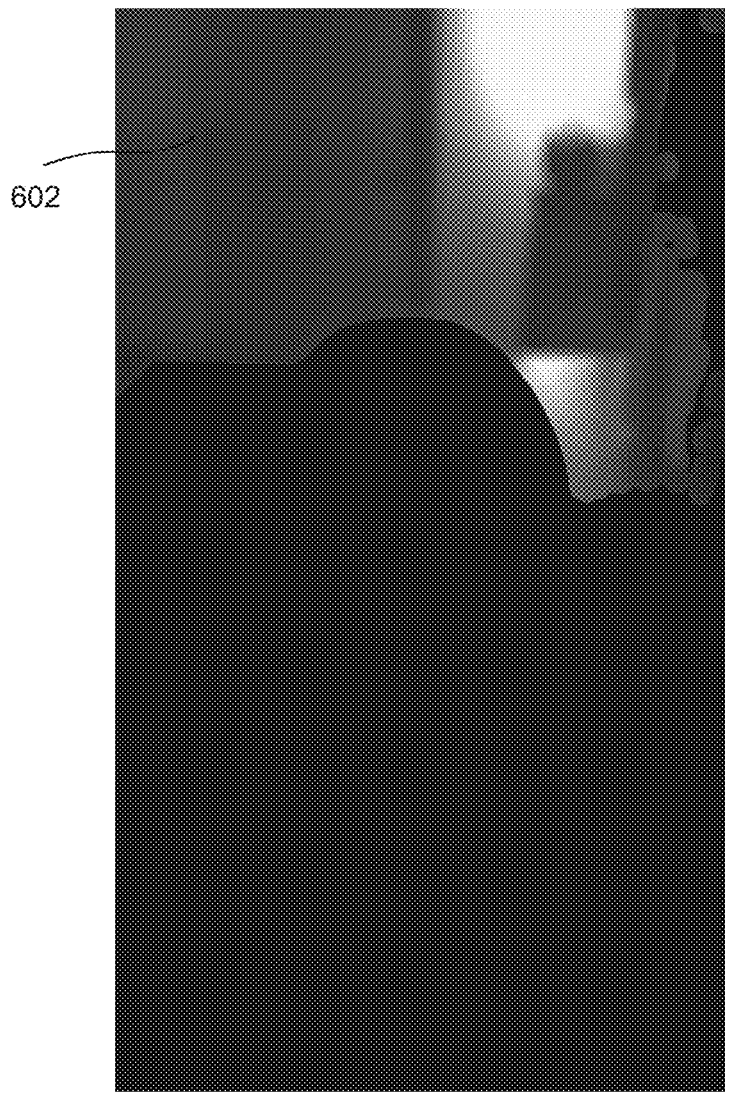
FIG. 7A illustrates an example blurred image, according to some implementations.

FIG. 7A illustrates an example blurred image 700, according to some implementations. As shown, interval 602 is blurred.

Figure 7B:
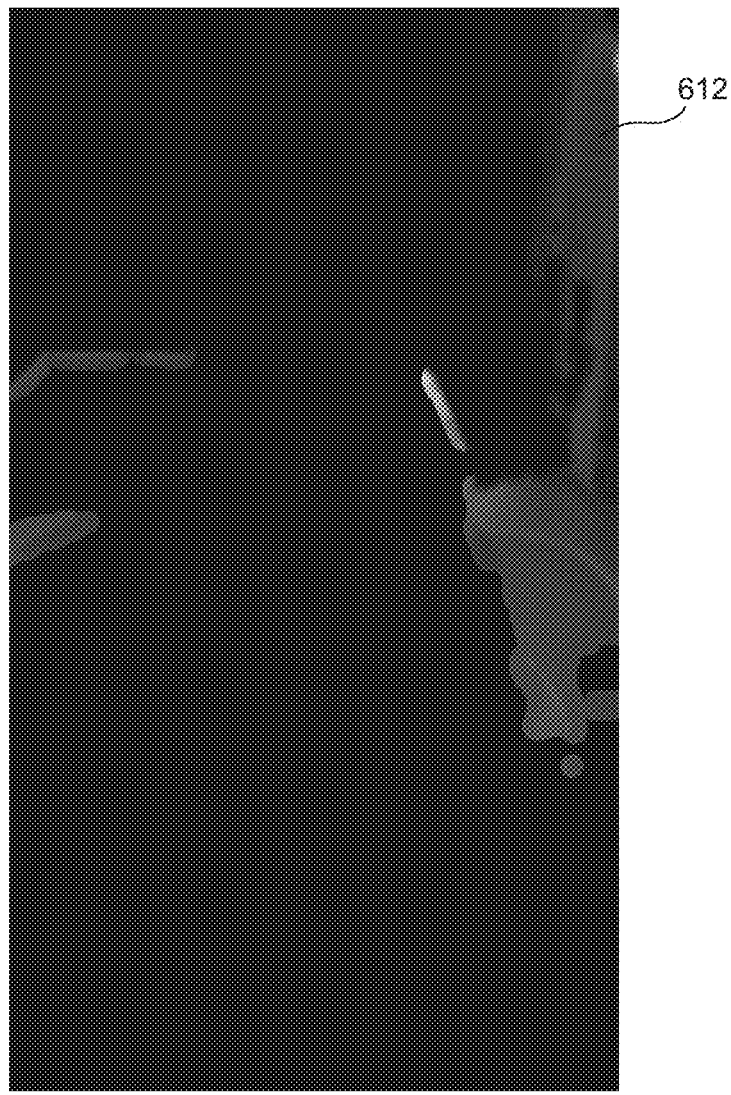
FIG. 7B illustrates an example blurred image, according to some implementations.

FIG. 7B illustrates an example blurred image 710, according to some implementations. As shown, interval 612 is blurred. In various implementations, interval 612 is blurred to a lesser degree than interval 602 (FIG. 7A).

Figure 7C:
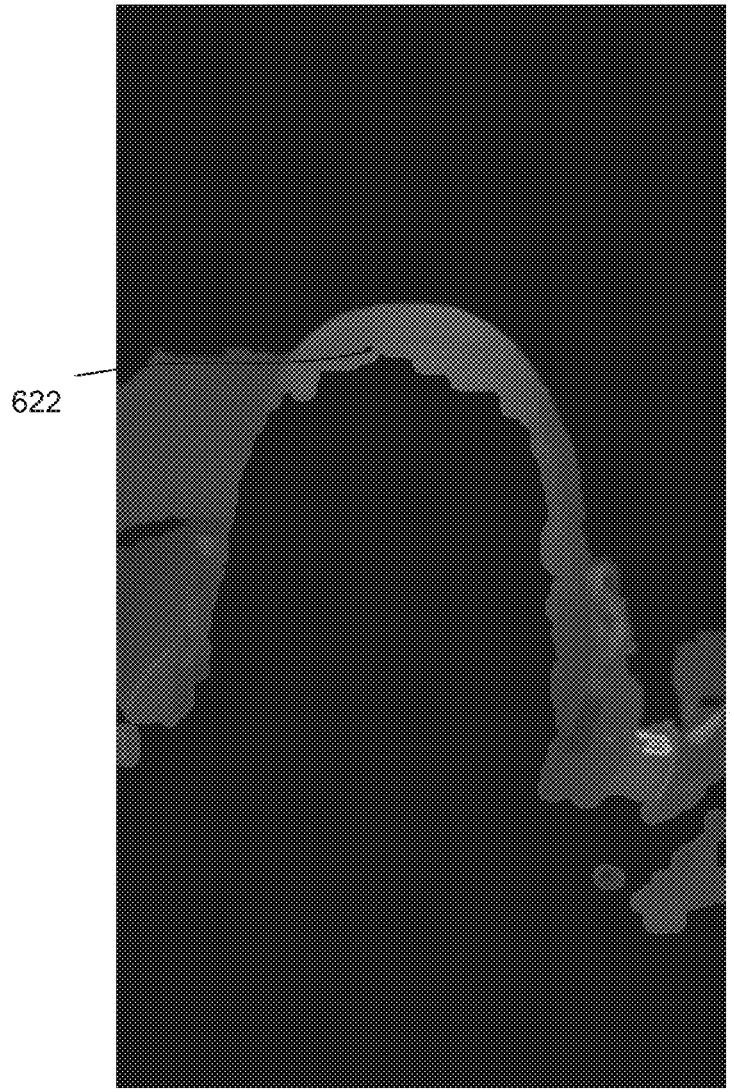
FIG. 7C illustrates an example blurred image, according to some implementations.

FIG. 7C illustrates an example blurred image 720, according to some implementations. As shown, interval 622 is blurred. In various implementations, interval 622 is blurred to a lesser degree than interval 612 (FIG. 7B).

Figure 7D:
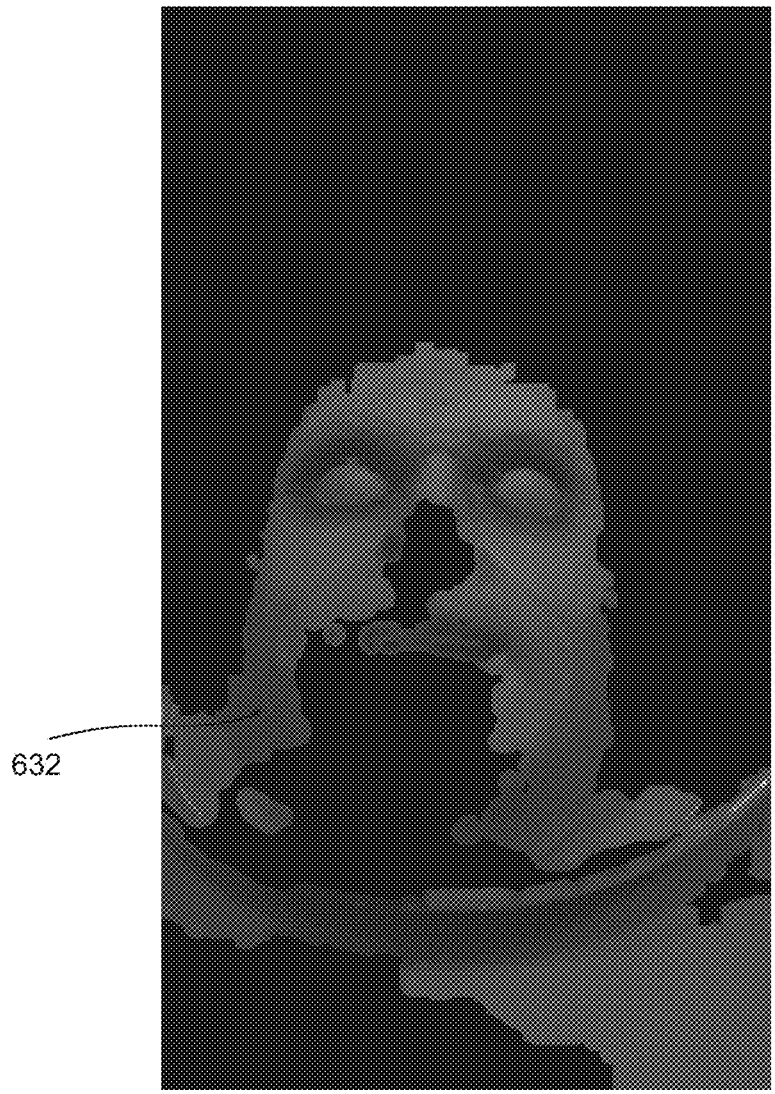
FIG. 7D illustrates an example blurred image, according to some implementations.

FIG. 7D illustrates an example blurred image 730, according to some implementations. As shown, interval 632 is blurred. In various implementations, interval 632 is blurred to a lesser degree than interval 622 (FIG. 7C).

Figure 7E:
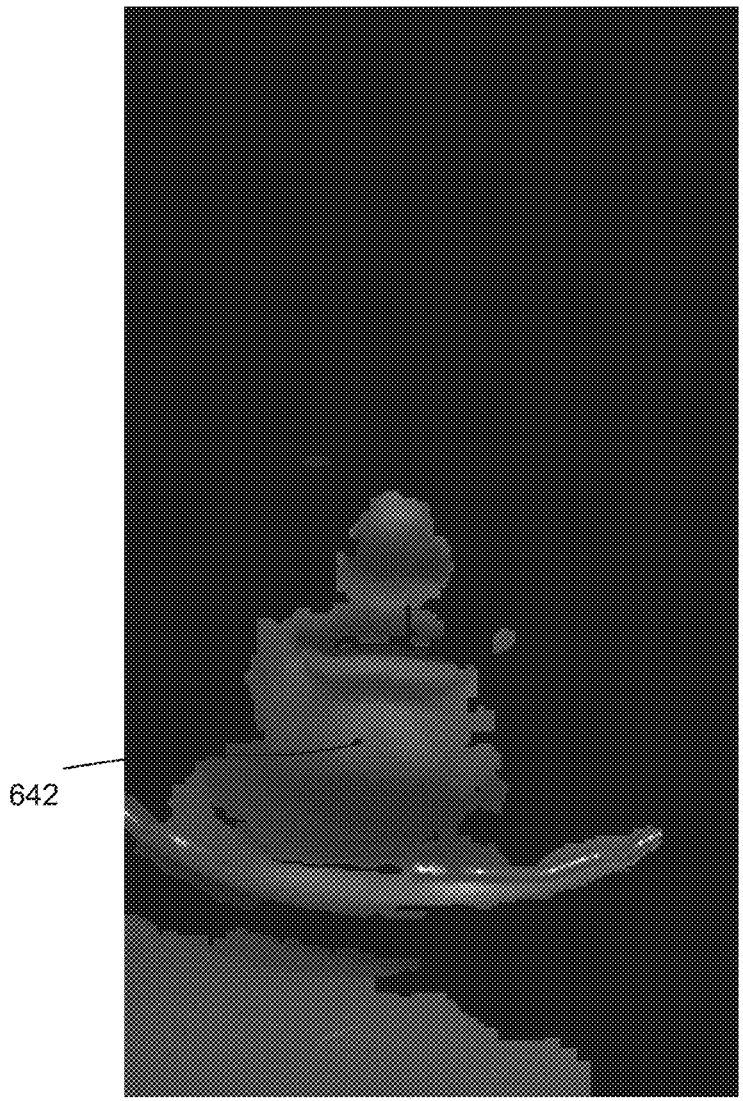
FIG. 7E illustrates an example blurred image, according to some implementations.

FIG. 7E illustrates an example blurred image 740, according to some implementations. As shown, interval 642 is blurred. In various implementations, interval 642 is blurred to a lesser degree than interval 632 (FIG. 7D).

Figure 7F:
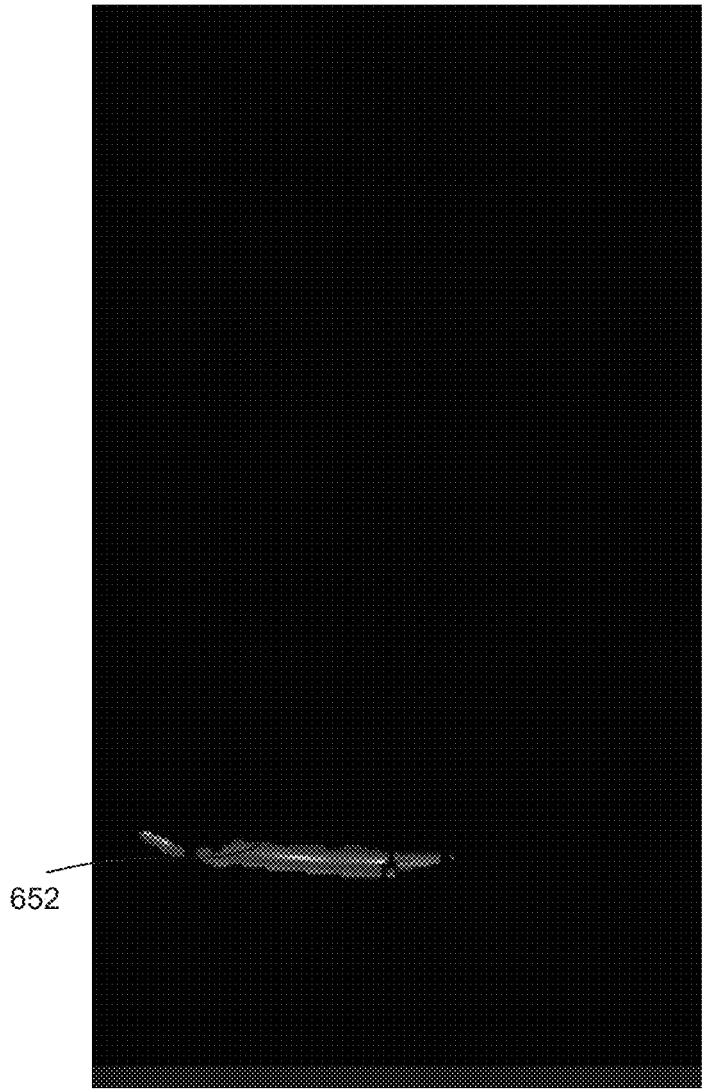
FIG. 7F illustrates an example blurred image, according to some implementations.

FIG. 7F illustrates an example blurred image 750, according to some implementations. As shown, interval 652 is blurred. In various implementations, interval 652 is blurred to a lesser degree than interval 642 (FIG. 7E).

FIGS. 8A-8F illustrate a series of example results from the blending process, where intervals are blended with adjacent intervals. In some implementations, the blurring is a disk blur. In some implementations, system 102 blends blurred pixels of a depth interval with previously blurred pixels of at least one other depth interval. In various implementations, this step may be multi-threaded.

Figure 8A:
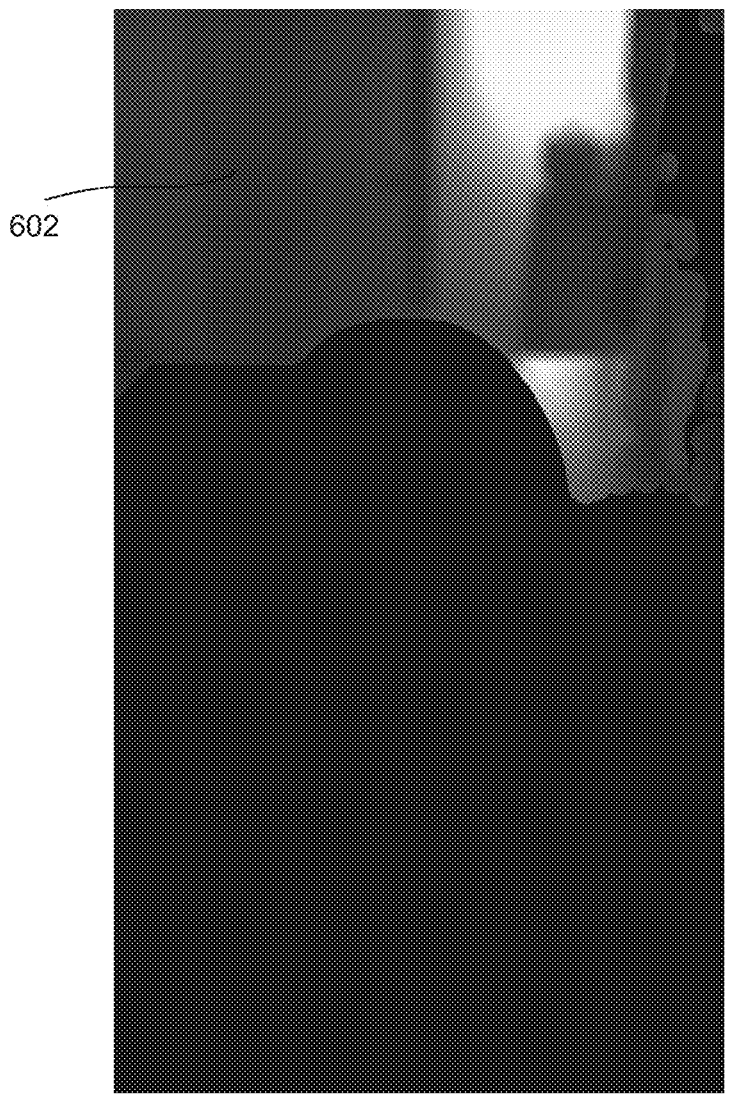
FIG. 8A illustrates an example image that includes a blurred interval, according to some implementations.

FIG. 8A illustrates an example image 800 that includes blurred interval 602, according to some implementations. FIG. 8A is the same as FIG. 7A, because blurred interval 602 is not yet blended.

Figure 8B:
FIG. 8B illustrates an example blended image, according to some implementations.

FIG. 8B illustrates an example blended image 810, where intervals 602 and 612 are blended, according to some implementations. Interval 612 is added to interval 602. As shown, edge of interval 602 that corresponds to the gray edge of mask 502 of FIG. 5A is blended with the edge of interval 612 that corresponds to white border 514 of mask 512 of FIG. 5B. The resulting blended image 810 includes intervals 602 and 612, where their adjoining edges are blended. In various implementations, system 102 applies a blending algorithm to the white borders 504, 514, 524, 534, 544, and 554. In various implementations, system 102 blends the pixels in the white borders linearly.

Figure 8C:
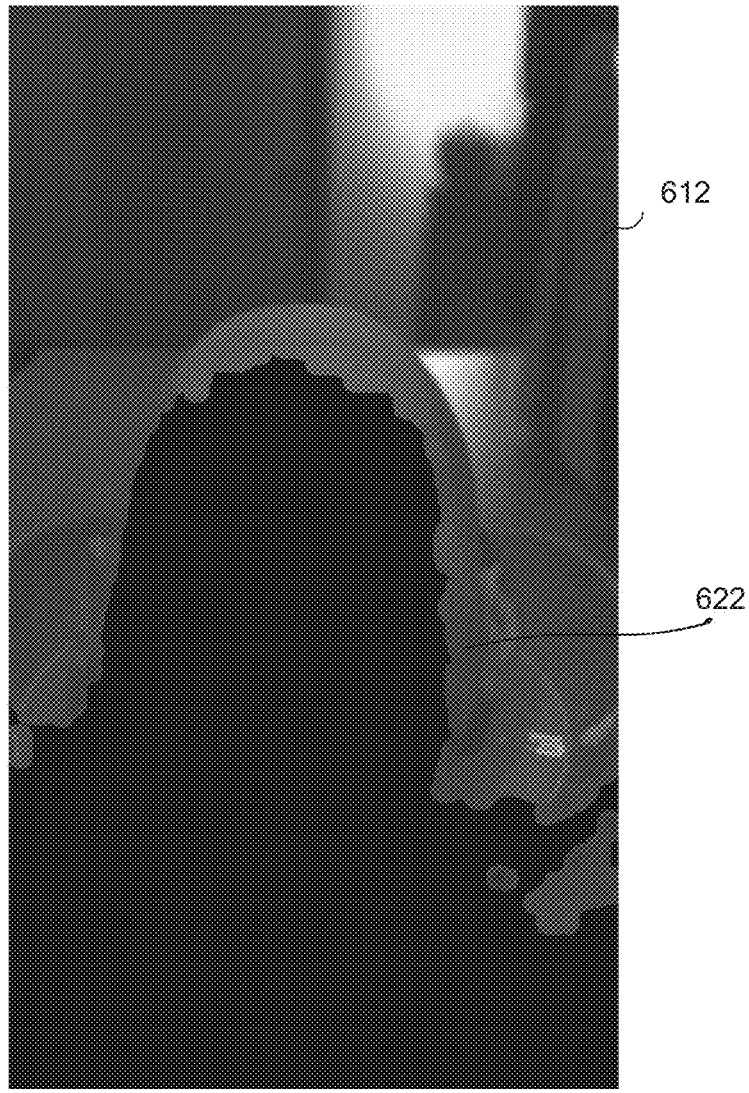
FIG. 8C illustrates an example blended image, according to some implementations.

FIG. 8C illustrates an example blended image 820, where intervals 612 and 622 are blended, according to some implementations. Interval 622 is added to interval 612. As shown, edge of interval 612 that corresponds to the gray edge of mask 512 of FIG. 5B is blended with the edge of interval 622 that corresponds to white border 524 of mask 522 of FIG. 5C. The resulting blended image 820 includes intervals 612 and 622, where their adjoining edges are blended.

Figure 8D:
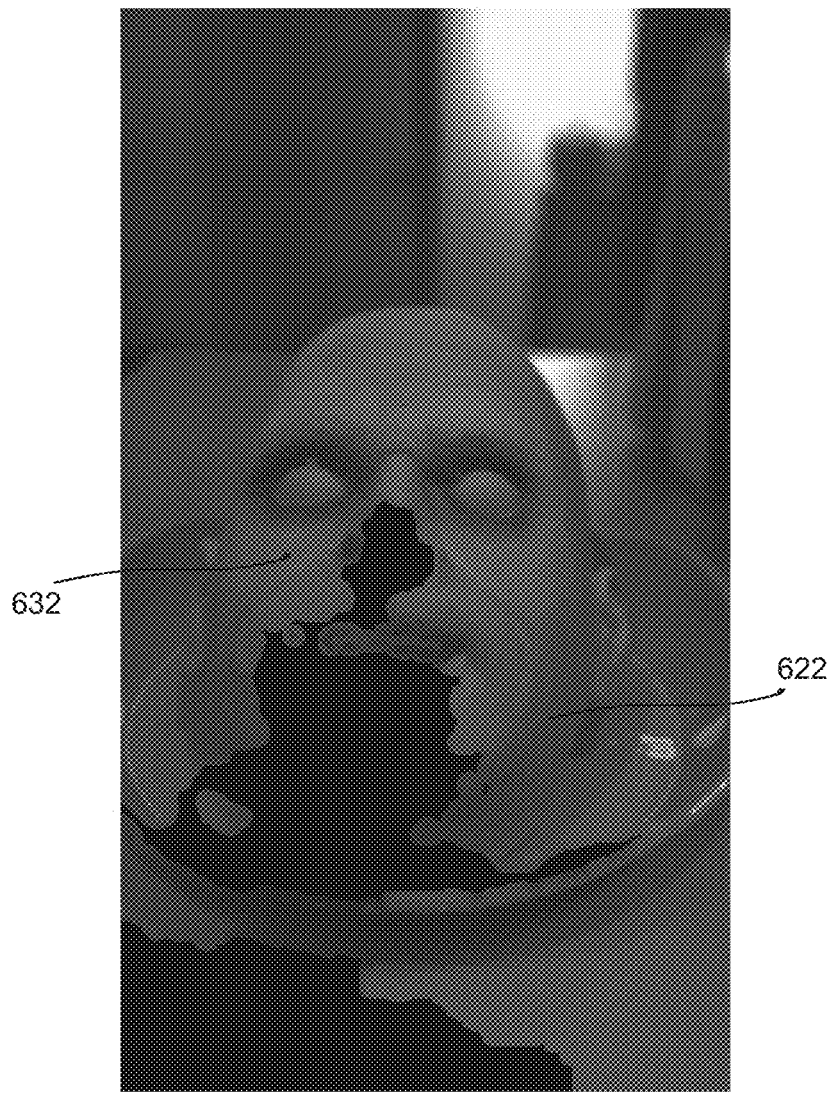
FIG. 8D illustrates an example blended image, according to some implementations.

FIG. 8D illustrates an example blended image 830, where intervals 622 and 632 are blended, according to some implementations. Interval 632 is added to interval 622. As shown, the edge of interval 622 that corresponds to the gray edge of mask 522 of FIG. 5C is blended with the edge of interval 632 that corresponds to white border 534 of mask 532 of FIG. 5D. The resulting blended image 830 includes intervals 622 and 632, where their adjoining edges are blended.

Figure 8E:
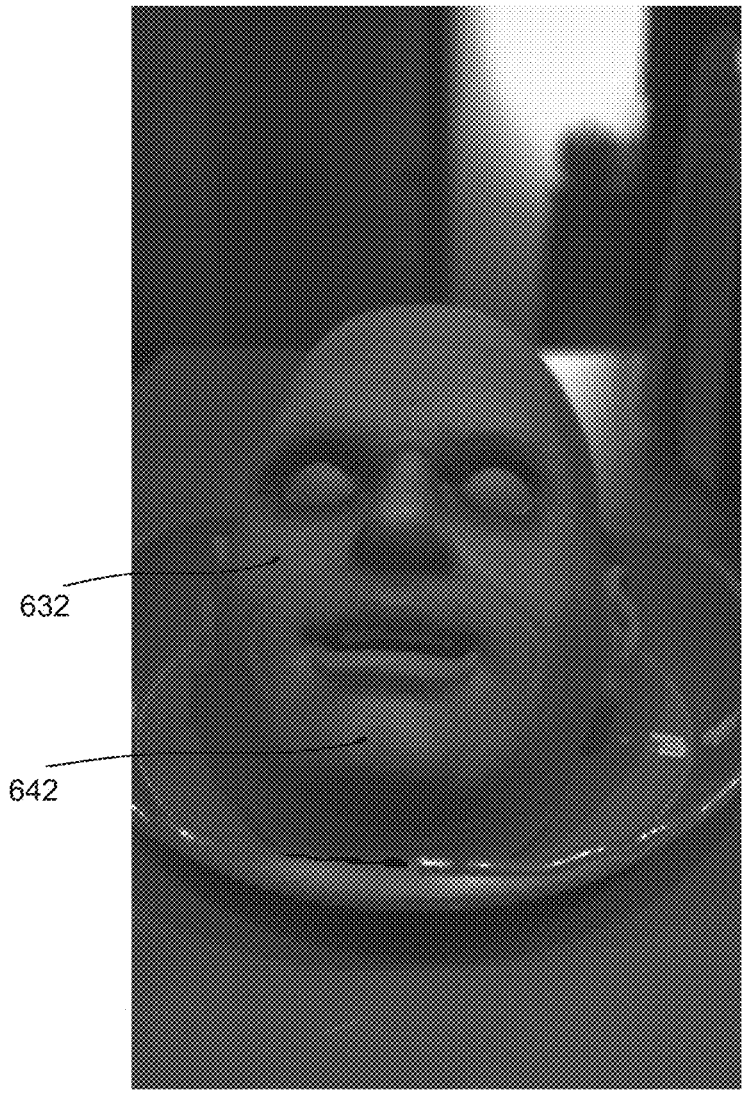
FIG. 8E illustrates an example blended image, according to some implementations.

FIG. 8E illustrates an example blended image 840, where intervals 632 and 642 are blended, according to some implementations. Interval 642 is added to interval 632. As shown, edge of interval 642 that corresponds to the gray edge of mask 532 of FIG. 5D is blended with the edge of interval 642 that corresponds to white border 544 of mask 542 of FIG. 5E. The resulting blended image 840 includes intervals 632 and 642, where their adjoining edges are blended.

Figure 8F:
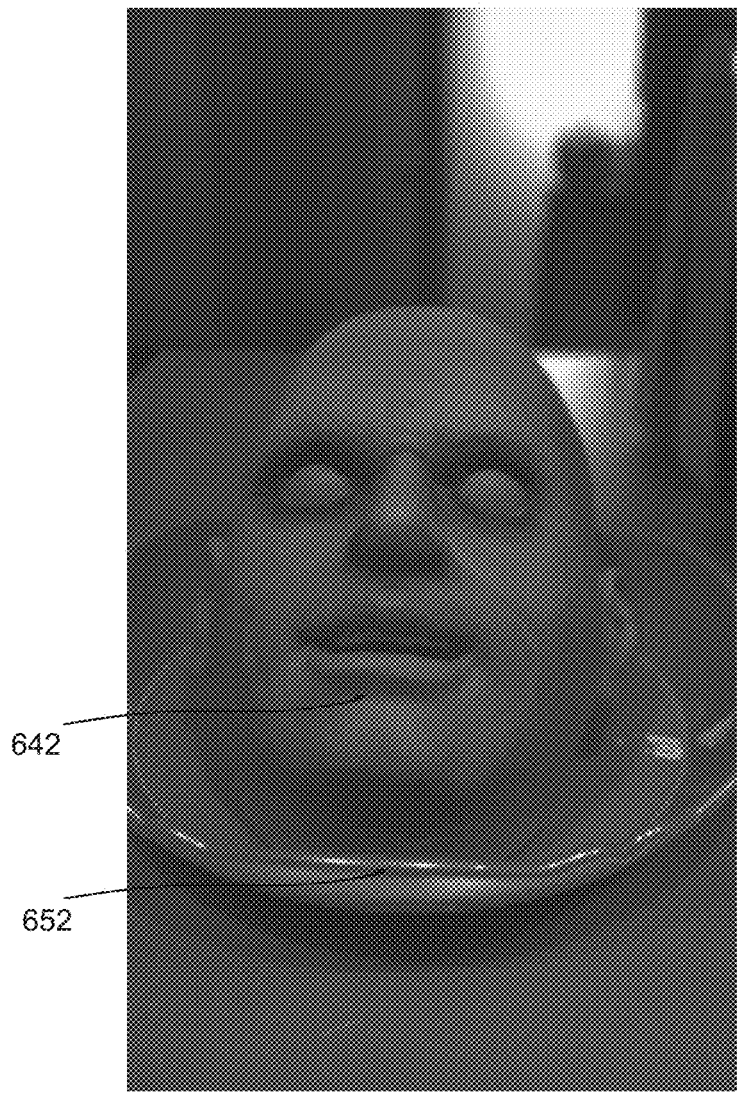
FIG. 8F illustrates an example blended image, according to some implementations.

FIG. 8F illustrates an example blended image 850, where intervals 642 and 652 are blended, according to some implementations. Interval 652 is added to interval 642. As shown, the edge of interval 642 that corresponds to the gray edge of mask 542 of FIG. 5E is blended with the edge of interval 652 that corresponds to white border 554 of mask 552 of FIG. 5F. The resulting blended image 850 includes intervals 642 and 652, where their adjoining edges are blended.

In block 208, system 102 applies at least one camera response function to the image after the pixels of the depth intervals are blurred. In other words, the blurred layers are merged together before the camera response function is applied. In various implementations, the camera response function is a gamma correction. As such, system 102 applies a gamma correction to the image after the pixels of the depth intervals are blurred.

Figure 9:
FIG. 9 illustrates an example final depth-of-field rendering, according to some implementations.

FIG. 9 illustrates an example final depth-of-field rendering 900, where system 102 has applied a gamma correction, according to some implementations. As a result, portions of the image that are in the focal plane are clear, and portions of the image that are out of the focal plane are blurred by different amounts according to the depth of the pixels and the focal plane. Implementations render an initially all-in-focus image such that it appears to have been captured with a single-lens reflex (SLR) camera or digital SLR (DSLR) camera. Furthermore, implementations enable a realistic blur with any aperture shape, and enables any kind of blur, e.g., disk blur, which is an ideal lens blur generated by a circular aperture. Other types of blurs can be used to simulate different aperture shapes.

Implementations described herein provide various benefits. For example, implementations provide depth-of-field renderings at a speed that is significantly faster that conventional solutions without sacrificing quality. Implementations are compatible with graphics processing unit (GPU) hardware, while producing high quality blur with various types of blur.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

While system 102 is described as performing the steps as described in the implementations herein, any suitable component or combination of components of system 102 or any suitable processor or processors associated with system 102 may perform the steps described.

Figure 10:
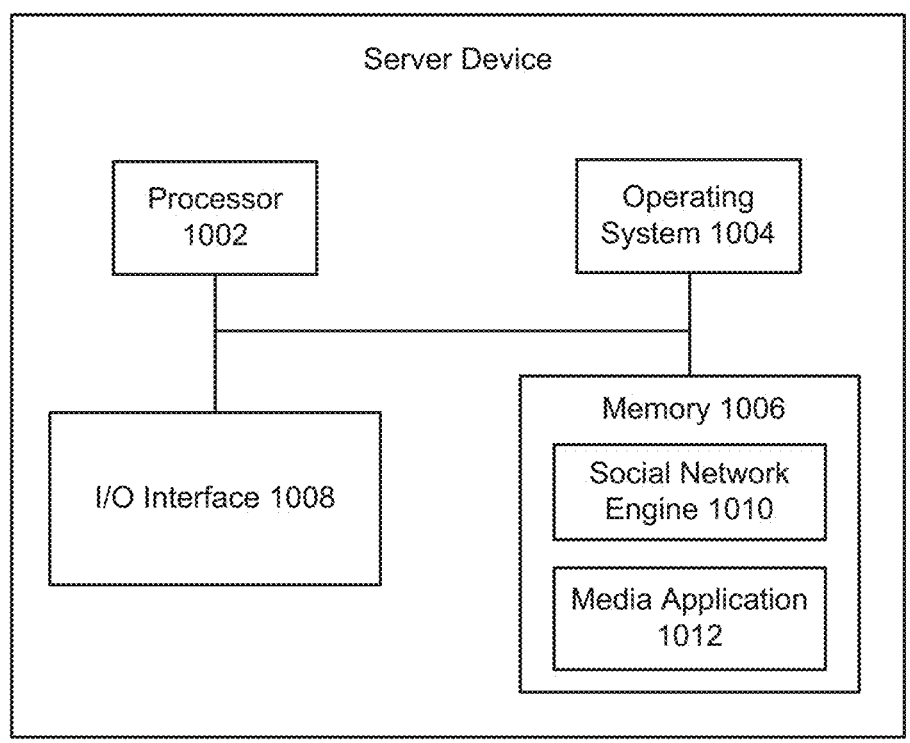
FIG. 10 illustrates a block diagram of an example server device, which may be used to implement the implementations described herein.

FIG. 10 illustrates a block diagram of an example server device 1000, which may be used to implement the implementations described herein. For example, server device 1000 may be used to implement server device 104 of FIG. 1, as well as to perform the method implementations described herein. In some implementations, server device 1000 includes a processor 1002, an operating system 1004, a memory 1006, and an input/output (I/O) interface 1008. Server device 1000 also includes a social network engine 1010 and a media application 1012, which may be stored in memory 1006 or on any other suitable storage location or computer-readable medium. Media application 1012 provides instructions that enable processor 1002 to perform the functions described herein and other functions.

For ease of illustration, FIG. 10 shows one block for each of processor 1002, operating system 1004, memory 1006, I/O interface 1008, social network engine 1010, and media application 1012. These blocks 1002, 1004, 1006, 1008, 1010, and 1012 may represent multiple processors, operating systems, memories, I/O interfaces, social network engines, and media applications. In other implementations, server device 1000 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and implementations. For example, some implementations are described herein in the context of a social network system. However, the implementations described herein may apply in contexts other than a social network. For example, implementations may apply locally for an individual user.

Note that the functional blocks, methods, devices, and systems described in the present disclosure may be integrated or divided into different combinations of systems, devices, and functional blocks as would be known to those skilled in the art.

Any suitable programming languages and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions for execution by the processor. The software instructions can also be contained in, and provided as, an electronic signal, for example in the form of software as a service (SaaS) delivered from a server (e.g., a distributed system and/or a cloud computing system).

What is claimed is:

1. A method comprising:
   linearizing an image, wherein the linearizing includes removing a camera response function that has been already applied to the image;
   partitioning a depth map of the image into a plurality of depth intervals;
   blurring pixels associated with each depth interval, wherein the pixels associated with each depth interval are blurred separately from the pixels of other depth intervals;
   while pixels of a current depth interval are blurred, applying a mask to pixels associated with a red-green-blue (RGB) color of non-current depth intervals that are not being blurred and that are in front of the current depth interval in the image, wherein the mask includes a mask border portion and a non-border portion;
   blending blurred pixels of at least one depth interval with previously blurred pixels of at least one other depth interval;
   blending an edge of the non-border portion of the mask for the at least one depth interval with the mask border portion of the mask for the at least one other depth interval;
   applying the camera response function to the image after the pixels of the plurality of depth intervals are blurred; and
   displaying the image after the camera response function is applied.

2. The method of claim 1, further comprising removing the pixels associated with the RGB color of the non-current depth interval that are not being blurred and that are in front of the current depth interval in the image that are masked.

3. The method of claim 1, wherein each depth interval corresponds to a predetermined power-of-N blur radius.

4. The method of claim 1, wherein the image is displayed as part of a user interface.

5. A method comprising:
   linearizing an image by removing gamma correction;
   partitioning a depth map of the image into a plurality of depth intervals;
   blurring pixels associated with each depth interval, wherein the pixels associated with each depth interval are blurred separately from the pixels of other depth intervals;
   while pixels of a current depth interval are blurred, applying a mask to pixels of non-current depth intervals that are not being blurred and masking a red-green-blue (RGB) color in the non-current depth intervals that are behind a focal plane of the image to remove artifacts, wherein the mask includes a mask border portion and a non-border portion;
   blending an edge of the non-border portion of the mask for the at least one depth interval, with the mask border portion of the mask for the at least one other depth interval;
   applying a camera response function to the image after the pixels of the plurality of depth intervals are blurred and the edge and the mask border are blended; and
   displaying the image after the camera response function is applied.

6. The method of claim 5, wherein the linearizing of the image comprises removing the camera response function that has been already applied to the image.

7. The method of claim 5, wherein each depth interval corresponds to a predetermined power-of-N blur radius.

8. The method of claim 5, wherein the depth intervals are disjointed.

9. The method of claim 5, wherein the blurring is a disk blur.

10. The method of claim 5, wherein masking pixels of the non-current depth intervals includes masking the RGB color of the non-current depth intervals that are in front of the current depth interval.

11. The method of claim 5, wherein the method further comprises in-painting masked pixels.

12. The method of claim 5, wherein the method further comprises blending blurred pixels of at least one depth interval with previously blurred pixels of at least one other depth interval.

13. The method of claim 5, wherein the blurring is applied to each depth interval using a Gaussian kernel.

14. The method of claim 5, wherein the blurring is applied to each depth interval using a disk kernel, and wherein a blur radius changes per pixel.

15. A system comprising:
   one or more processors;
   a memory; and
   a media application stored in the memory and executed by the one or more processors, the media application operable to perform operations comprising:
      linearizing an image by removing gamma correction;
      partitioning a depth map of the image into a plurality of depth intervals;
      blurring pixels associated with each depth interval, wherein the pixels associated with each depth interval are blurred separately from the pixels of other depth intervals;
      while pixels of a current depth interval are blurred, applying a mask to pixels of non-current depth intervals that are not being blurred and masking a red-green-blue (RGB) color in the non-current depth intervals that are behind a focal plane of the image to remove artifacts, wherein the mask includes a mask border portion and a non-border portion;
      blending an edge of the non-border portion of the mask for the at least one depth interval, with the mask border portion of the mask for the at least one other depth interval;
      applying a camera response function to the image after the pixels of the plurality of depth intervals are blurred and the edge and the mask border are blended; and
      displaying the image after the camera response function is applied.

16. The system of claim 15, wherein, to linearize the image, the media application when executed is further operable to perform operations comprising removing the camera response function that has been previously applied to the image.

17. The system of claim 15, wherein each depth interval corresponds to a predetermined power-of-N blur radius.

18. The system of claim 15, wherein the depth intervals are disjointed.

19. The system of claim 15, wherein the blurring is a disk blur.

20. The system of claim 15, wherein masking pixels of the non-current depth intervals includes masking the RGB color of the non-current depth intervals that are in front of the current depth interval.

* * * * *